US011094011B2

(12) United States Patent
Chiong et al.

(10) Patent No.: US 11,094,011 B2
(45) Date of Patent: Aug. 17, 2021

(54) ACTIONABLE CONTEXTUALIZED ALERTS WITHIN AN ORDER MANAGEMENT SYSTEM

(71) Applicant: FIDESSA TRADING UK LIMITED, London (GB)

(72) Inventors: Freddie Chiong, New York, NY (US); Kurt Erich Huhner, New York, NY (US); Adam Levy, Monmouth Beach, NJ (US); Anthony J. Martinez, Lake Grove, NY (US); James J. Biancamano, Hillsborough, NJ (US); Juan Carlos Mauras, West New York, NJ (US)

(73) Assignee: FIDESSA TRADING UK LIMITED, London (GB)

(*) Notice: Subject to any disclaimer, the term of this patent is extended or adjusted under 35 U.S.C. 154(b) by 457 days.

(21) Appl. No.: 15/879,623

(22) Filed: Jan. 25, 2018

(65) Prior Publication Data

US 2018/0211317 A1    Jul. 26, 2018

Related U.S. Application Data

(60) Provisional application No. 62/450,314, filed on Jan. 25, 2017.

(51) Int. Cl.
*G06Q 40/00* (2012.01)
*G06Q 40/04* (2012.01)
(Continued)

(52) U.S. Cl.
CPC ......... *G06Q 40/04* (2013.01); *G06Q 30/0185* (2013.01); *G06Q 30/0607* (2013.01)

(58) Field of Classification Search
CPC . G06Q 40/04; G06Q 30/0185; G06Q 30/0607
(Continued)

(56) References Cited

U.S. PATENT DOCUMENTS 10,275,778 B1 *   4/2019   Maag ..................... G06Q 40/00
10,552,735 B1 *   2/2020   Widerhorn .............. G06N 3/08
(Continued)

FOREIGN PATENT DOCUMENTS

CA            2699754 C   * 10/2016   ............. G06Q 40/06

OTHER PUBLICATIONS

Merriam-Webster Dictionary—online: "Definition of contextualize" (Year: 2020).*
(Continued)

*Primary Examiner* — Edward J Baird
(74) *Attorney, Agent, or Firm* — Baker Botts L.L.P.

(57) ABSTRACT

The methods and systems described herein can be used for proactively monitoring regulatory compliance within an order management system, and for providing a real-time or near real-time recommendation relating to a subgroup of information containing suspicious attributes of a trade before the trade is executed. As such, market abuse monitoring is integrated with the order management system to provide historical trade data, identify a subgroup of information containing the suspicious attributes, and provide an actionable and contextualized real-time or near real-time recommendation to a compliance officer or other appropriate individual, officer, or office. As such, potential market abuse can be prevented by, for example, a rejection of the trade. By providing proactive surveillance rather than reactive surveillance relating to potential market abuse, fines or other consequences are also prevented. As such, compliance is improved.

11 Claims, 9 Drawing Sheets

(51) Int. Cl.
*G06Q 30/06* (2012.01)
*G06Q 30/00* (2012.01)

(58) Field of Classification Search
USPC .................................................. 705/35–40
See application file for complete search history.

(56) References Cited

U.S. PATENT DOCUMENTS

| | | | | |
|---|---|---|---|---|
| 2005/0097026 A1* | 5/2005 | Morano | ................. | G06Q 40/04 |
| | | | | 705/37 |
| 2010/0057626 A1* | 3/2010 | Lutnick | ................ | G06Q 50/188 |
| | | | | 705/80 |
| 2013/0151373 A1* | 6/2013 | Flanagan | ............. | G06Q 30/018 |
| | | | | 705/26.25 |
| 2015/0339673 A1* | 11/2015 | Adjaoute | ............ | G06F 21/6245 |
| | | | | 705/30 |
| 2017/0083974 A1* | 3/2017 | Guillen | .................. | G06Q 40/04 |
| 2017/0214708 A1* | 7/2017 | Gukal | ................. | H04L 63/1433 |

OTHER PUBLICATIONS

Miller et al: "High Frequency Trading: Overview of Recent Developments", Congressional Research Service, 7- . . . www.crs.gov, R44443, Apr. 2016 (Year: 2016).*

* cited by examiner

ACTIONABLE CONTEXTUALIZED ALERTS WITHIN AN ORDER MANAGEMENT SYSTEM

CROSS REFERENCE TO RELATED APPLICATIONS

This application claims benefit of U.S. Provisional Patent Application No. 62/450,314, filed Jan. 25, 2017, the entirety of which is herein incorporated by reference.

BACKGROUND

Traders engaged in the trading of market instruments can utilize computer software and hardware tools that provide various graphical user interfaces to display market data, execute orders, and monitor the status of the trade order and/or general market conditions.

Activities in the financial services industry, including trading practices and market making activities, are monitored and surveyed for regulatory compliance, potential cases of market abuse, and requirements for best execution. Current market abuse monitoring techniques leverage order and trade data stored in a database to detect suspicious activity on an end of day basis. In addition, current compliance tools provide an alert to suspicious market activity after a trade has been executed, sometimes days later, in response to the trade execution. As such, fines and or other adverse consequences may result. Therefore, what is needed is a proactive compliance tool which prevents potential market abuses by leveraging historical trade data coupled with an order management system to provide an actionable and contextualized alert in real-time or near real-time.

SUMMARY

The purpose and advantages of the disclosed subject matter will be set forth in the description that follows, as well as will be learned by practice of the disclosed subject matter. Additional advantages of the disclosed subject matter will be realized and attained by the methods and systems particularly pointed out in the written description and claims hereof, as well as from the appended drawings.

To achieve these and other advantages and in accordance with the purpose of the disclosed subject matter, as embodied and broadly described, the disclosed subject matter is directed to systems and methods for monitoring compliance within an order management system.

The present disclosure is directed to methods and systems for proactively monitoring compliance within an order management system. The methods and systems disclosed can be configured to leverage order and trade data stored in a database to detect suspicious activity in near real-time or real-time. After identifying a subgroup of information having suspicious attributes, a recommendation relating to the subgroup of information is provided before the trade is executed, which identifies the suspicious attributes.

In one embodiment, a method for proactively monitoring compliance within an order management system is disclosed. The method includes receiving a first order for an electronic trade by the order management system and analyzing information associated with historical trade data to determine if the first order contains suspicious attributes. Suspicious attributes can include an unusual trade size, a trade that has unusual liquidity, or a price move, among others. The historical trade data can be received prior to the receiving of the first order. The method also includes flagging the first order in response to the determining and comparing the first order and/or subsequent orders to a market snapshot. The market snapshot is captured at approximately the same time as the receiving of the first order. The method further includes identifying a subgroup of information containing the suspicious attributes and providing a recommendation relating to the subgroup of information before a trade is executed. The recommendation is actionable and contextualized, and is based on the comparing and the identifying. Furthermore, the recommendation can identify the first order as including the suspicious attributes.

In another embodiment, a computer system for proactively monitoring regulatory compliance within an order management system is disclosed. The computer system includes a processor and a memory. The memory stores instructions that, when executed by the processor, cause the computer system to carry out the method disclosed supra.

In another embodiment, a non-transitory computer-readable medium storing instructions that, when executed by a processor, cause a computer system to proactively monitor regulatory compliance within an order management system is disclosed. The non-transitory computer-readable medium performs the steps to carry out the method disclosed supra.

Among others, the present disclosure reduces and/or eliminates the problems and disadvantages associated with the monitoring of regulatory compliance techniques disclosed in the prior art.

It is to be understood that both the foregoing general description and the following detailed description are exemplary and are intended to provide further explanation of the disclosed subject matter claimed.

The accompanying drawings, which are incorporated in and constitute part of this specification, are included to illustrate and provide a further understanding of the disclosed subject matter. Together with the description, the drawings serve to explain the principles of the disclosed subject matter.

BRIEF DESCRIPTION OF THE DRAWINGS

Figures 7, 8:
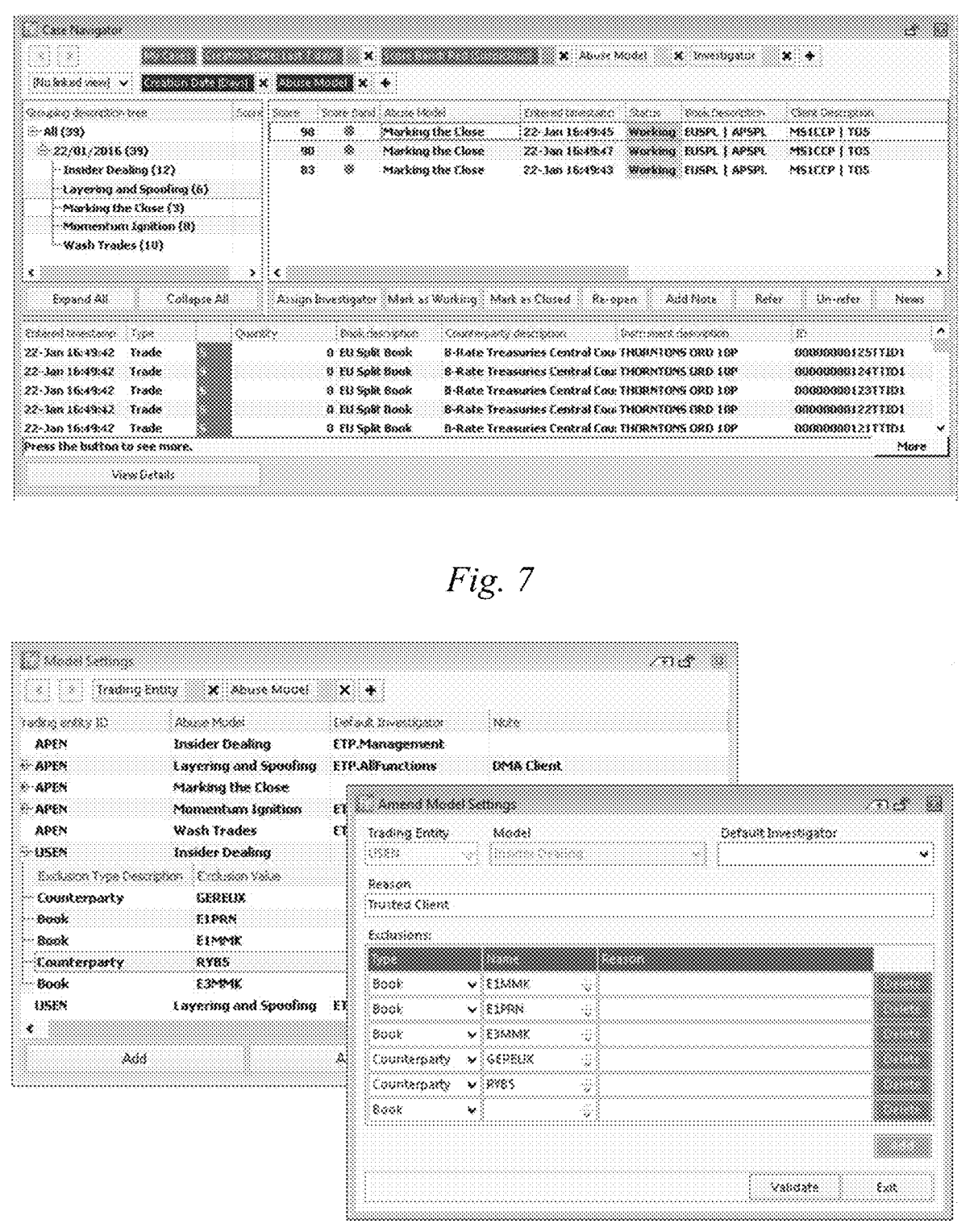

FIGS. 7-10 each schematically illustrate examples of a graphical user interface output, according to embodiments disclosed herein.

DETAILED DESCRIPTION

Reference will now be made in detail to the various exemplary embodiments of the disclosed subject matter, exemplary embodiments of which are illustrated in the accompanying drawings.

The methods and systems described herein can be used for proactively monitoring compliance within an order management system, and for providing a recommendation relating to a subgroup of information containing suspicious attributes of a trade before the trade is executed. As such, market abuse monitoring is integrated with the order management system to provide analysis of historical trade data, identify a subgroup of information containing the suspicious attributes, and provide an actionable and contextualized recommendation to a compliance officer or other appropriate individual, officer, or office in real-time or near real-time. Moreover, in some embodiments, the actionable and contextualized recommendation is provided in real-time. As such, potential market abuse can be prevented by, for example, a rejection of the trade. By providing proactive surveillance rather than reactive surveillance relating to potential market abuse, fines or other adverse consequences can be prevented. As such, compliance is improved.

Figure 1:
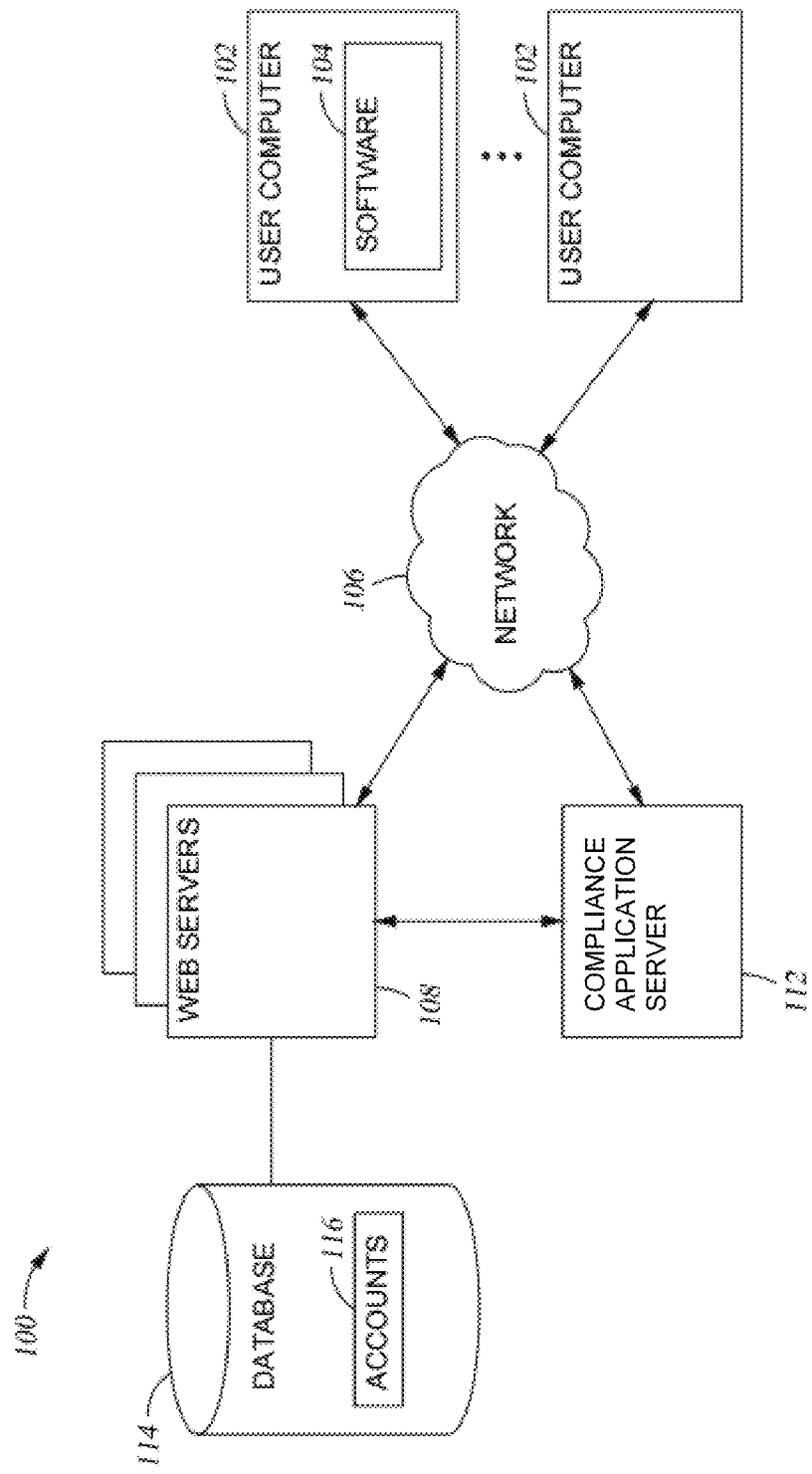
FIG. 1 illustrates a computer system configured for providing a compliance application, according to one embodiment described here.

FIG. 1 illustrates a computing system 100 configured for providing a compliance application in which embodiments of the disclosure can be practiced. As shown, the computing system 100 can include a plurality of web servers 108, a compliance application server 112, and a plurality of user computers (i.e., mobile devices, wireless devices, desktop devices, etc.) 102 (only two of which are shown for clarity), each connected to a communications network 106 (for example, the Internet). The web servers 108 can communicate with the database 114 via a local connection (for example, a Storage Area Network (SAN) or Network Attached Storage (NAS)) or over the Internet (for example, a cloud based storage service). The web servers 108 are configured to either directly access data included in the database 114 or to interface with database manager that is configured to manage data included within the database 114. An account 116 is a data object that stores data associated with a user, such as the user's email address, password, contact information, billing information, and the like.

Each user computer 102 can include conventional components of a computing device, for example, a processor, system memory, a hard disk drive, a battery, input devices such as a mouse and a keyboard, and/or output devices such as a monitor or graphical user interface, and/or a combination input/output device such as a touchscreen which not only receives input but also displays output. Each web server 108 and the compliance application server 112 can include a processor and a system memory (not shown), and can be configured to manage content stored in database 114 using, for example, relational database software and/or a file system. The web servers 108 can be programmed to communicate with one another, user computers 102, and the compliance application server 112 using a network protocol such as, for example, the TCP/IP protocol. The compliance application server 112 can communicate directly with the user computers 102 through the communications network 106. The user computers 102 are programmed to execute software 104, such as web browser programs and other software applications, and access web pages and/or applications managed by web servers 108 by specifying a uniform resource locator (URL) that directs to web servers 108.

In the embodiments described below, users are respectively operating the user computers 102 that are connected to the web servers 108 over the communications network 106. Web pages are displayed to a user via the user computers 102. The web pages are transmitted from the web servers 108 to the user's computer 102 and processed by the web browser program stored in that user's computer 102 for display through a display device and/or a graphical user interface in communication with the user's computer 102.

It is noted that the user computer 102 can be a personal computer, laptop, mobile computing device, smart phone, game console, home digital media player, network-connected television, set top box, tablet, and/or other computing devices having components suitable for communicating with the communications network 106. In some embodiments, the user computer 102 can also execute other software applications configured to receive content from the compliance application, such as, but not limited to, other compliance software, media players, and/or widget platforms, among others.

Figure 2:
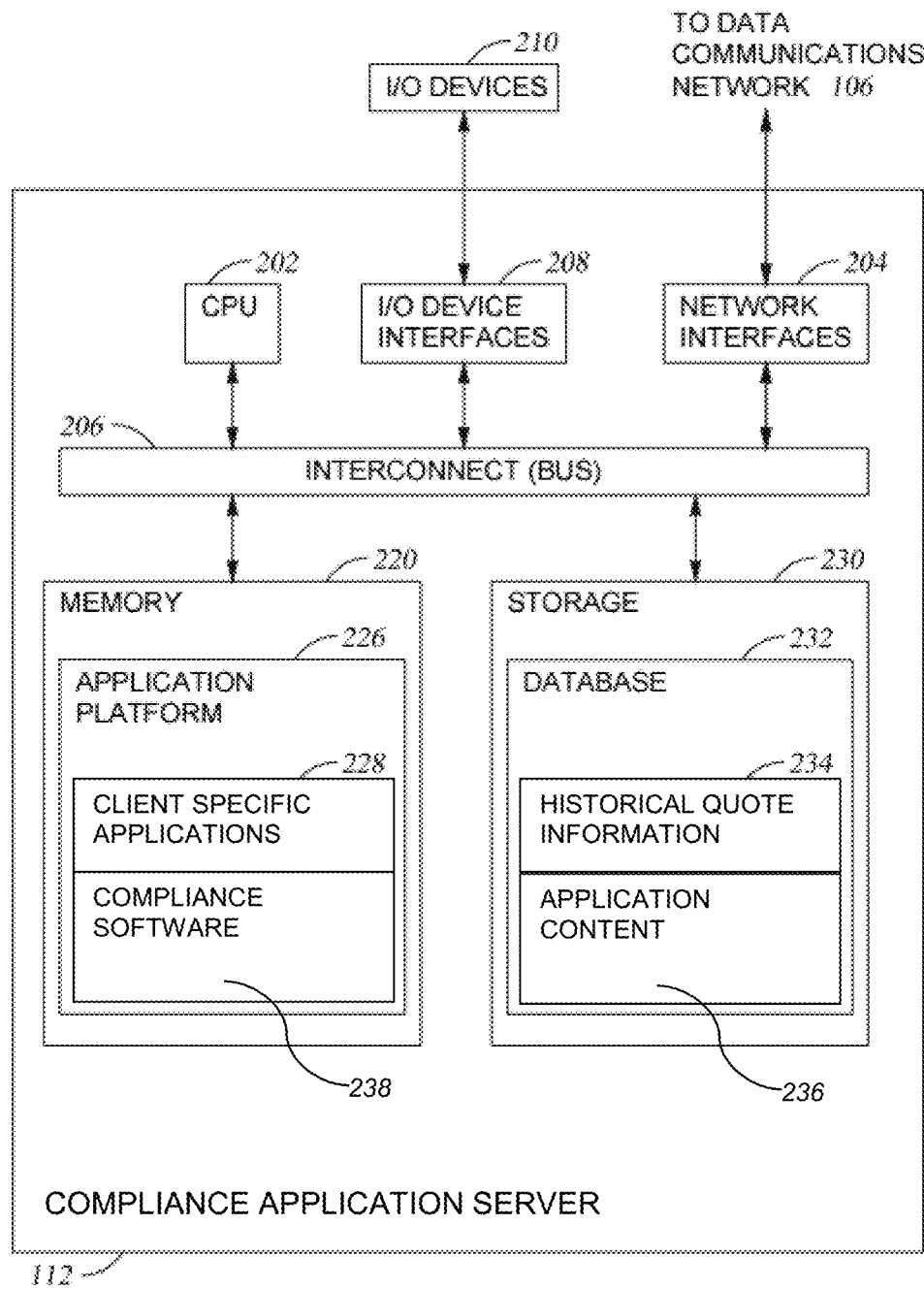
FIG. 2 illustrates a more detailed view of a server of FIG. 1, according to one embodiment described herein.

FIG. 2 illustrates a more detailed view of the compliance application server 112 of FIG. 1. The compliance application server 112 includes, without limitation, a central processing unit (CPU) 202, a network interface 204, a memory 220, and storage 230 communicating via an interconnect 206. The compliance application server 112 can also include I/O device interfaces 208 connecting I/O devices 210 (for example, keyboard, mouse, video, audio, touchscreen, etc.). The compliance application server 112 can further include the network interface 204 configured to transmit data via the communications network 106.

The CPU 202 retrieves and executes programming instructions stored in the memory 220 and generally controls and coordinates operations of other system components. Similarly, the CPU 202 stored and retrieves application data residing in the memory 220. The CPU 202 is included to be representative of a single CPU, multiple CPUs, a single CPU having multiple processing cores, and the like. The interconnect 206 is used to transmit programming instructions and application data between the CPU 202, I/O device interfaces 208, storage 230, network interfaces 204, and memory 220.

The memory 220 is generally included to be representative of a random access memory and, in operation, stores software applications and data for use by the CPU 202. Although shown as a single unit, the storage 230 can be a combination of fixed and/or removable storage devices, such as fixed disk drives, floppy disk drives, hard disk drives, flash memory storage drives, tape drives, removable memory cards, CD-ROM, DVD-ROM, Blu-Ray, HD-DVD, optical storage, network attached storage (NAS), cloud storage, or a storage-area network (SAN) configured to store non-volatile data.

The memory 220 can store instructions and logic for executing an application platform 226 which can include client specific applications 228 and/or compliance software 238. The storage 230 can store data, media, metadata, historical data, and other user generated media and can include a database 232 configured to store historical quote information 234. The database 232 can also store application content 236 relating to data associated with user generated media or other application features. The database 232 can be any type of storage device.

Network computers are another type of computer system that can be used in conjunction with the disclosures provided herein. Network computers do not usually include a hard disk other mass storage, and the executable programs are loaded from a network connection into the memory 220 for executing by the CPU 202. A typical computer will usually include at least a processor, memory, and an interconnect coupling the memory to the processor.

Figure 3:
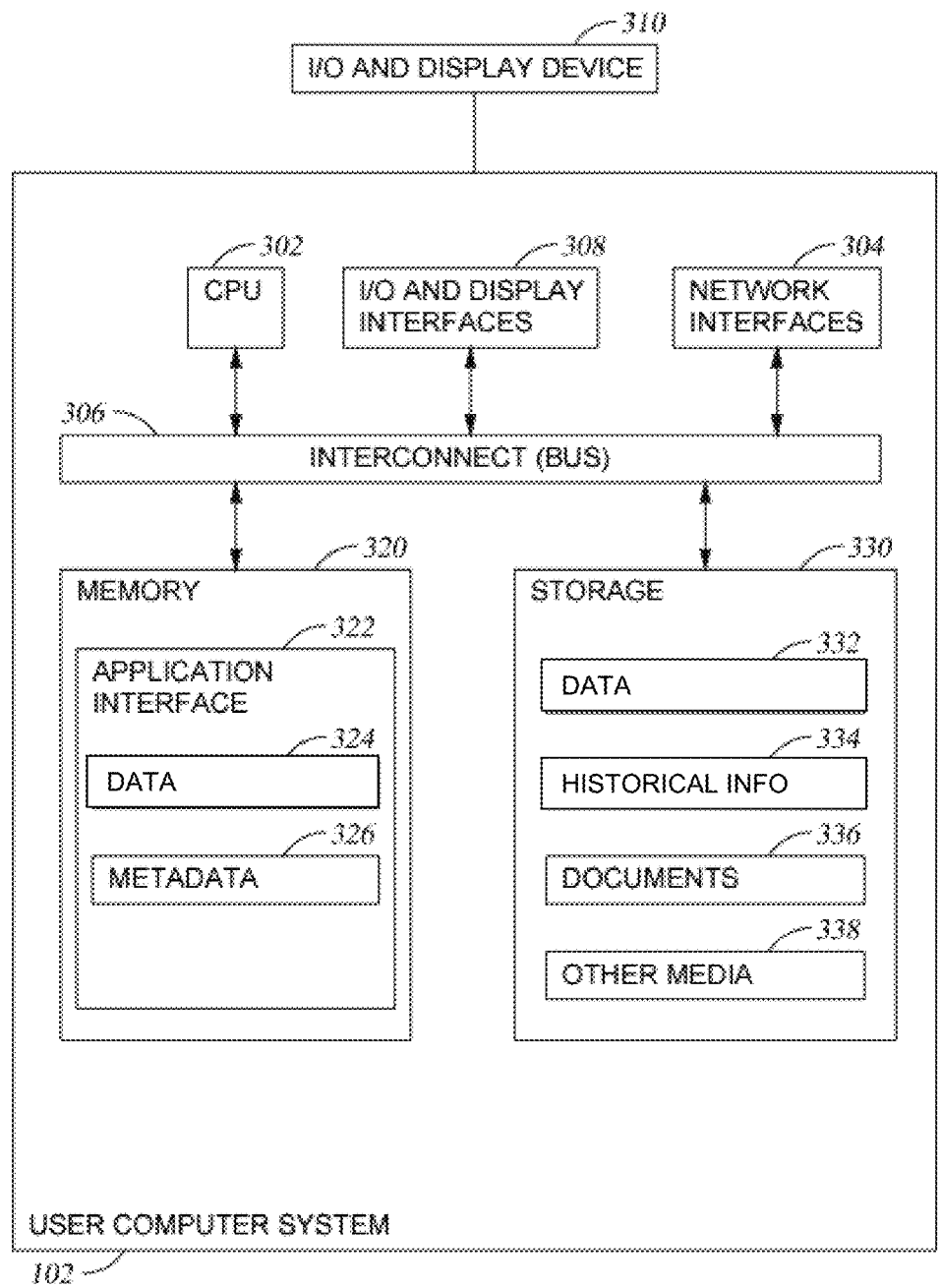
FIG. 3 illustrates a user computing system used to access and utilize the compliance application, according to one embodiment described herein.

FIG. 3 illustrates a user computer 102 used to access the compliance application server 112 and display data and/or recommendations associated with the application platform 226. The user computer 102 can include, without limitation, a central processing unit (CPU) 302, a network interface 304, an interconnect 306, a memory 320, and storage 330. The user computer 102 can also include an I/O device interface 308 connecting I/O devices 310 (for example, keyboard, display, touchscreen, and mouse devices) to the user computer 102.

Like CPU 202, CPU 302 is included to be representative of a single CPU, multiple CPUs, a single CPU having multiple processing cores, etc., and the memory 320 is generally included to be representative of a random access memory. The interconnect 306 can be used to transmit programming instructions and application data between CPU 302, I/O device interfaces 308, storage 330, network interface 304, and memory 320. The network interface 304 can be configured to transmit data via the communications network 106. Storage 330, such as a hard disk drive or a solid-state drive (SSD), can store non-volatile data. The storage 330 can contain data 332, historical information 334, documents 336, and other media 338. Illustratively, the memory 320 can include an application interface 322, which can display data and/or store data or metadata 326. The application interface 322 can provide one or more software application which allow the user to access data and other media or content hosted by the compliance application server 112.

It should be borne in mind, however, that these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities with the computer system memories or registers or other such information storage, transmission, or display devices.

The present embodiment also relates to an apparatus for performing the operations herein. This apparatus can be specially constructed for the required purposes, or it can comprise a general purpose computer selectively activated or reconfigured by a computer program stored in the computer. Such a computer program can be stored in a computer readable storage medium, such as, but is not limited to, read-only memories (ROMs), random access memories (RAMs), EPROMs, EEPROMs, flash memory, magnetic or optical cards, any type of disk including floppy disks, optical disks, CD-ROMs, and magnetic-optical disks, or any type of media suitable for storing electronic instructions, and each coupled to a computer system interconnect.

The algorithms and displays presented herein are not inherently related to any particular computer or other apparatus. Various general purpose systems can be used with programs in accordance with the teachings herein, or it can prove convenient to construct a more specialized apparatus to perform the required method operations. The structure for a variety of these systems will appear from the description herein. In addition, the present examples are not described with reference to any particular programming language, and various examples may thus be implemented using a variety of programming languages.

As described in greater detail herein, embodiments of the present disclosure provide a system and method for proactively monitoring compliance within an order management system, and for providing a recommendation relating to a subgroup of information containing suspicious attributes of a trade before the trade is executed. As such, market abuse monitoring is integrated with the order management system to provide for analysis of historical trade data, identify a subgroup of information containing the suspicious attributes, and provide an actionable and contextualized recommendation to a compliance officer or other appropriate individual, officer, or office. In some embodiments, the recommendation is in real-time or near real-time. As such, potential market abuse can be prevented by, for example, a rejection or blocking of the trade. By providing proactive surveillance rather than reactive surveillance relating to potential market abuse, fines or other adverse consequences can be prevented. As such, compliance can be improved.

Figure 4:
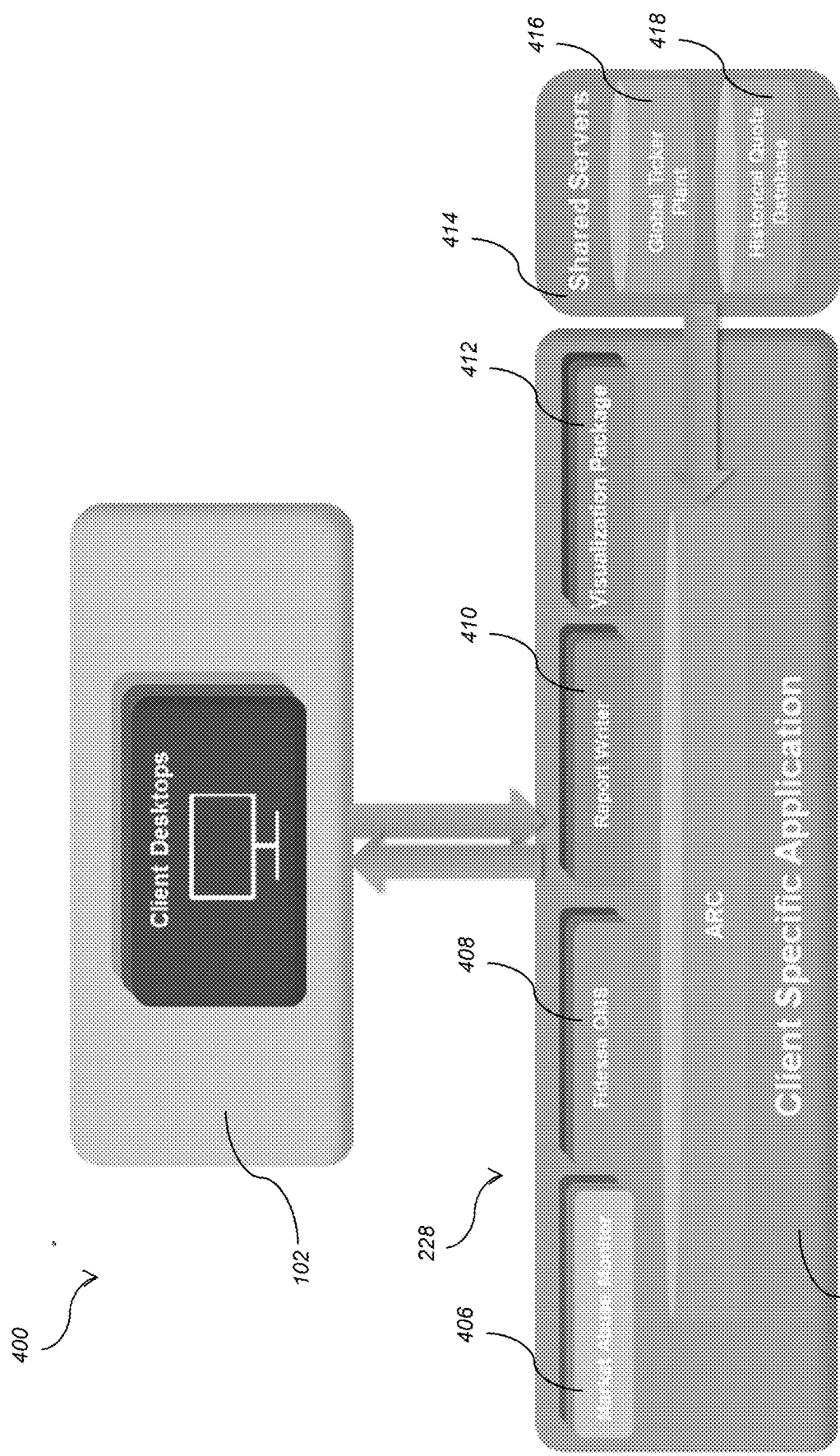
FIG. 4 illustrates a conceptual diagram of certain components of the client specific application of the compliance application, according to one embodiment described herein.

FIG. 4 illustrates a conceptual diagram 400 of additional components 402 of the client specific application 228 of the compliance application server 112. As shown, the client specific application includes a storage device 404, a market abuse monitor 406, an order management system 408, a report writer 410, and a charting program 412, each of which can be operatively connected within the client specific application 228. The storage device 404 can collect and store data and/or serve as transactional message storage. Furthermore, additional shared servers 414 can be operatively connected to the client specific application 228. In certain embodiments, the shared servers 414 can include a global ticker plant 416 and/or a historical quote database 418. The shared servers 414 source and distribute information globally. The global ticker plant provides market data in real or near-real time. The historical quote database 418 replays market data for any given time upon request. Furthermore, the client specific application 228 of the compliance application server 112 can be displayed on a graphical user interface of the user computer 102.

The storage device 404 allows for the long term storage of online accessible data which can monitor compliance with governmental, regulatory, or other requirements. As such, the storage device 404 allows for near instantaneous access to trading data, provides market data and the ability to recreate market events via a market replay, maintain risk limit breaches, provide user specific data, as well as provide bespoke data access via a third party interface.

The market abuse monitor 406 leverages an order received by a user as well as historic trade data stored in the long term storage device 404 to find potential suspicious attributes and/or activity associated with the order. As such, electronic surveillance of orders can be provided in real-time or near real-time. However, in addition to leveraging the order received by comparing the order with historic trade data, each order received is also leveraged with the order management system 408, wherein the order management system 408 is coupled with the market abuse monitor 406. As such, contextualized real-time or near real-time alerts can be provided within the order management system to prevent potential market abuse.

By way of example only, a late trade received in isolation is not suspicious on its own. However, in continuing the example, if late trades are continuously received on five or more instances, it has become a pattern. As such, on the sixth occurrence a real-time or near real-time contextualized alert for the late trading activity can be generated and, in some embodiments, distributed to a senior management official, compliance officer, or the like. As such, the trade can be cancelled, blocked, or rejected as appropriate, allowing for the prevention of fines and for proactive surveillance. Each contextualized real-time or near real-time alert is customizable and can be configured to alert to any pattern and/or activity.

Additionally, the market abuse monitor 406 can detect, prevent, and/or report other suspicious activities, including layering, spoofing, wash sales, insider trading, front running, and best execution, among others.

In some embodiments, the market abuse monitor 406 can include case management capabilities including auto-generation and the ability to monitor specific cases, exhibit capture, production of audit trails and evidence of review, status alerts, and management reporting and review.

The report writer 410 is configured to provide customized reporting. As such, the report writer 410 can be a module with capabilities that provide for detailed reporting and monitoring. The report writer 410 can deliver enhanced standard reports, allow for flexible and customizable ad-hoc queries and/or exception reports, support multi-format reports, allows for shared access globally and/or in private mode, and allows for digital signatures for evidence of review.

The charting program 412 can visualize trend analysis. In some embodiments, the charting program 412 can provide a market visualization of suspicious activity trends, provide an alert integration with the order management system, provide user-configurable capabilities to review multi-dimensional, real-time events, provide customizable methods to capture, share, and/or display data, and provide drill-through capabilities.

Figure 5:
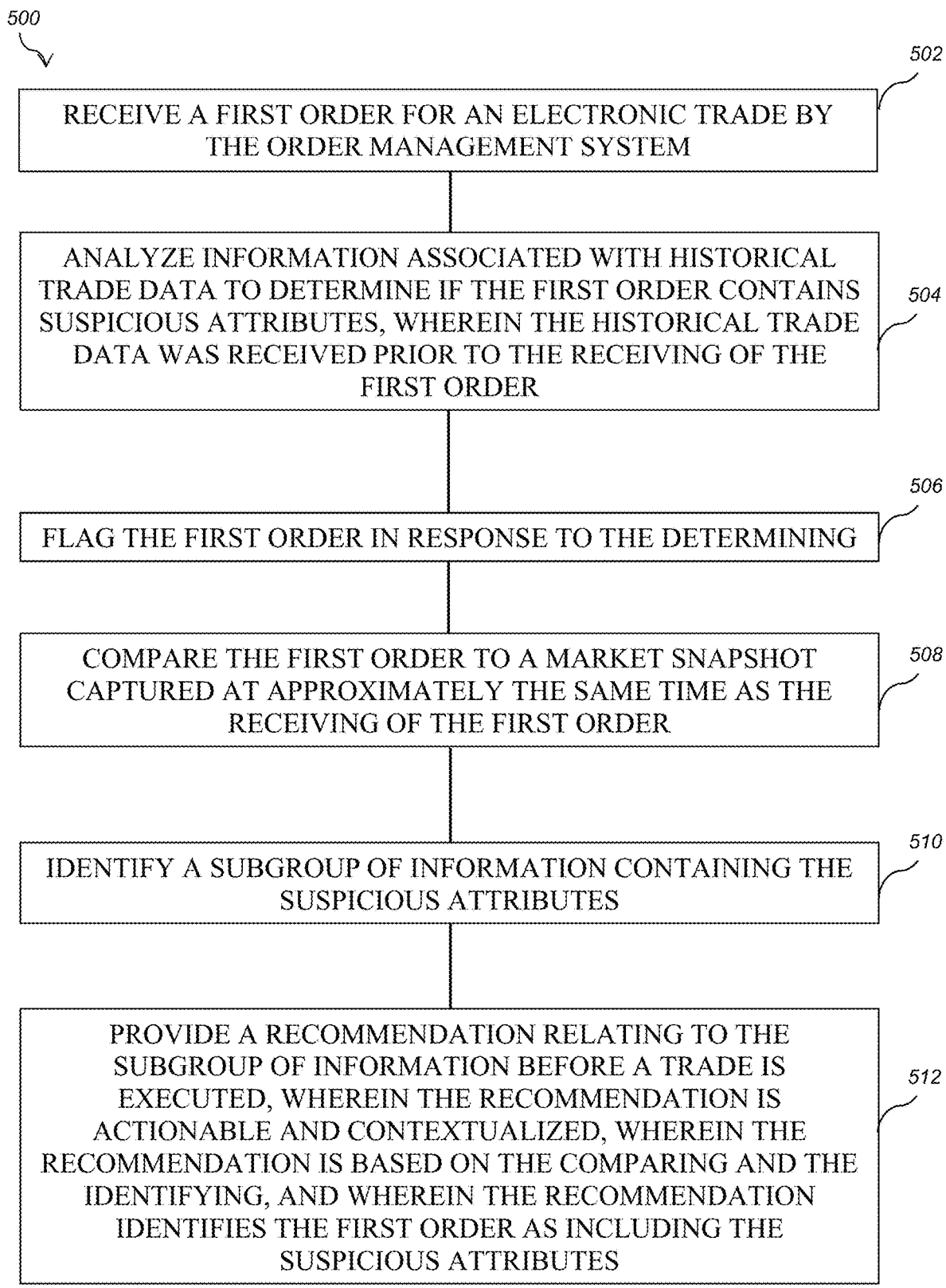
FIG. 5 schematically illustrates operations of a method for monitoring regulatory compliance within an order management system, according to one embodiment described herein.

FIG. 5 illustrates operations of a method 500 for monitoring regulatory compliance within an order management system. The method generally relates to embodiments wherein trade orders are monitored for regulatory compliance and a real-time or near real-time alert to instances of potential abuse, unlawful conduct, suspicious activity, or other risk to prevent said order from being executed, prevent fines, prevent potential market abuse, and to provide a proactive solution to surveillance.

At operation 502, a first order for an electronic trade is received by the order management system. The first order can flow in to the order management system from a third party source, such as a user computer 102 or other suitable device. The order management system 408 can capture the order and subsequently route the order instructions, as appropriate. Routing can be performed electronically or manually.

At operation 504, information associated with historical trade data is analyzed to determine if the first order contains suspicious attributes. The historical trade data can be stored in a database. In some embodiments, the database is operatively connected to the order management system. Furthermore, the historical database includes at least one of order data and trade data. The order data and the trade data are each associated with at least two previous orders. In some embodiments, each of the two previous orders were submitted by and/or relate to the same entity, user, and/or customer.

In some embodiments, the historical trade data can be received prior to the receiving of the first order. The historical trade data can be specifically related to the customer and/or person who provided the trade order or it can be generally related to data received in a specified time period. As such, based on the analysis of the historical trade data, a pattern of activity can be determined. Certain transactions can be considered suspicious activity. For example, late trades and/or high volume trades oftentimes can be suspicious as they can relate to insider trading. Furthermore, other suspicious activities which can be detected and prevented in real-time or near real-time include layering, spoofing, wash sales, insider trading, front running, best execution, among others.

At operation 506, the first order is flagged in response to the determining. If it is determined that a pattern, suspicion, or concern can be raised with respect to the order received as compared to the historical trade data, the first order is flagged. Flagging can also be in response to the use of fuzzy map logic and can include a statistical analysis which is utilized to gather a statistical percentage and determine if the statistical percentage is one, two, three, etc. standard deviations away from a statistical average.

At operation 508, the first order and/or subsequent orders are compared to a market snapshot. The market snapshot can be stored in a historical quote database operatively connected with the order management system. The market snapshot is captured at approximately the same time as the receiving of the first order. The market snapshot provides actual market information regarding general and specific information relating to the state of the market at a particular time. The market snapshot can be provided by the global ticker plant 414, discussed supra.

At operation 510, a subgroup of information containing the suspicious attributes is identified. For example, if multiple trades or orders are received, specific trades or orders are identified as containing suspicious attributes. The specific suspicious attributes for each order are subsequently identified in real-time or near real-time and classified into a subgroup containing each suspicious attribute for the particular order.

At operation 512, a recommendation relating to the subgroup of information is provided before a trade is executed. The recommendation can be provided in real-time or near real-time. In some embodiments, the recommendation is actionable and contextualized. Furthermore, the recommendation is based on the comparing and the identifying of suspicious activity based on historical patterns. Also, the recommendation identifies the first order and/or subsequent orders as including the suspicious attributes. By way of example only, the recommendation can be provided to a compliance officer and/or management in real-time. The recommendation can suggest in real-time, for example, that order be blocked, further analyzed and investigated, delayed, or continued, depending on the analysis of the suspicious attributes and the comparison to the market snapshot.

The compliance application server 112 can further deliver the capability to monitor risk by providing for the ability to review individual transaction across accounts in real-time (or near real-time) or historically for patterns and trends, counterparty limits, buying power calculations, market access checks, and/or kill switch. The monitoring of risks allows for customization and/or assignment of risk factors and/or scoring schemes to identify high risk versus low risk accounts. Furthermore, the monitoring of risks allows for expedited and real-time risk review processes and includes the ability to perform macro risk surveillance across any number of parameters (i.e. traders, sectors, supervisors, individual stocks, etc.).

Figure 6:
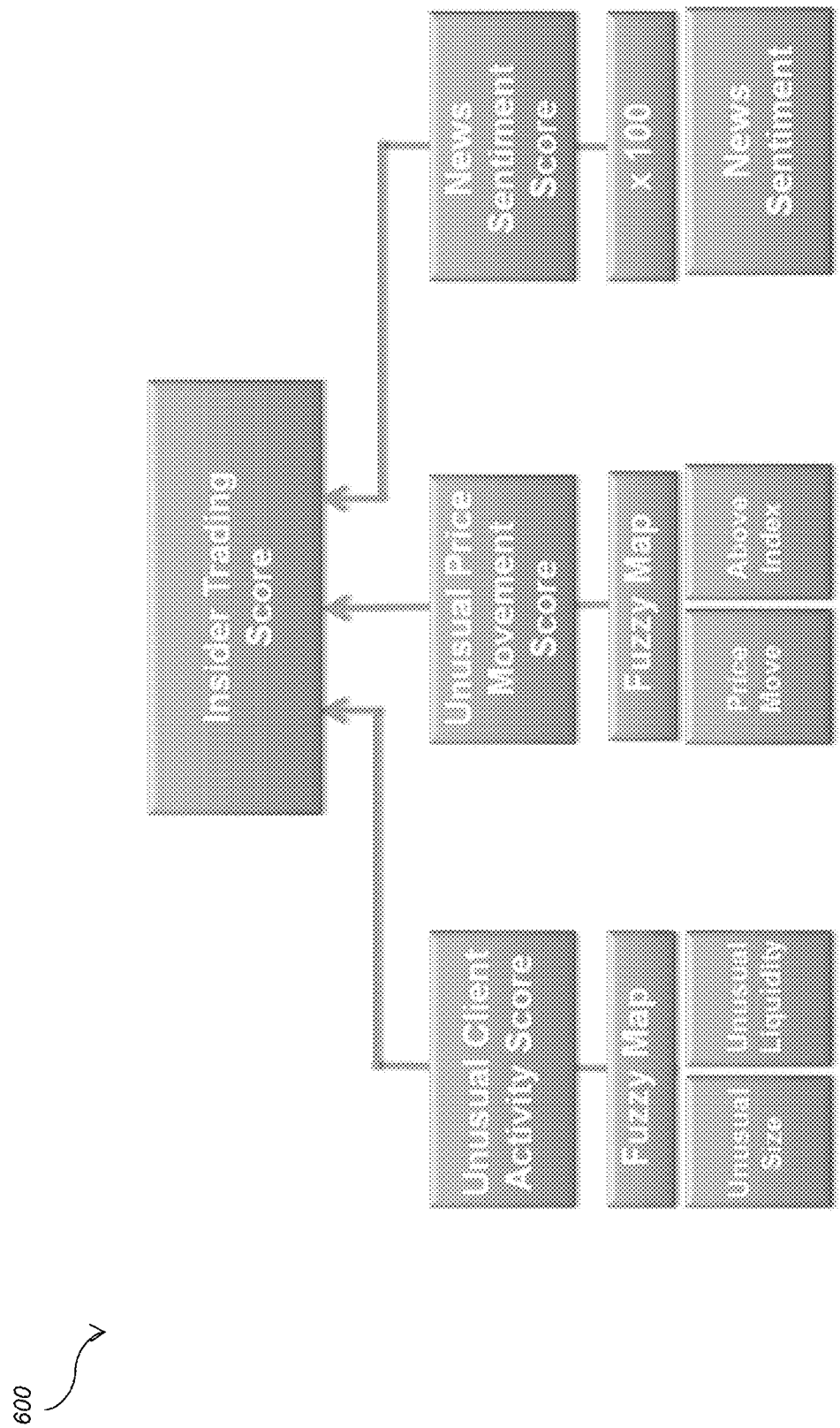
FIG. 6 schematically illustrates an example model for determining suspicious attributes of a trade, according to one embodiment described herein.
Figure 9:
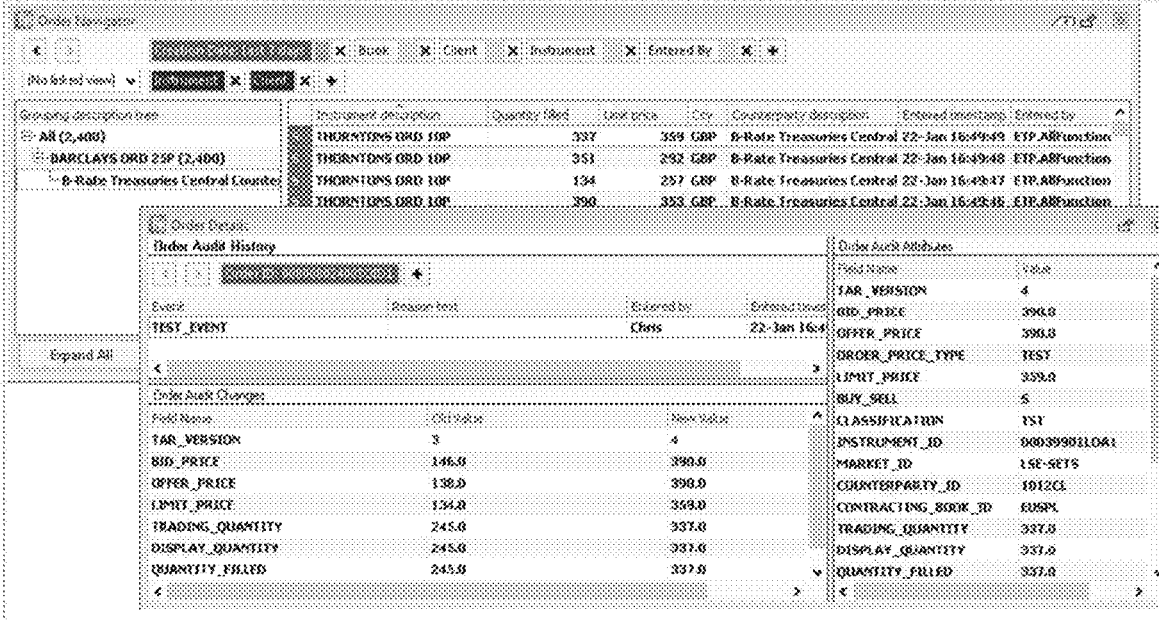
Figure 10:
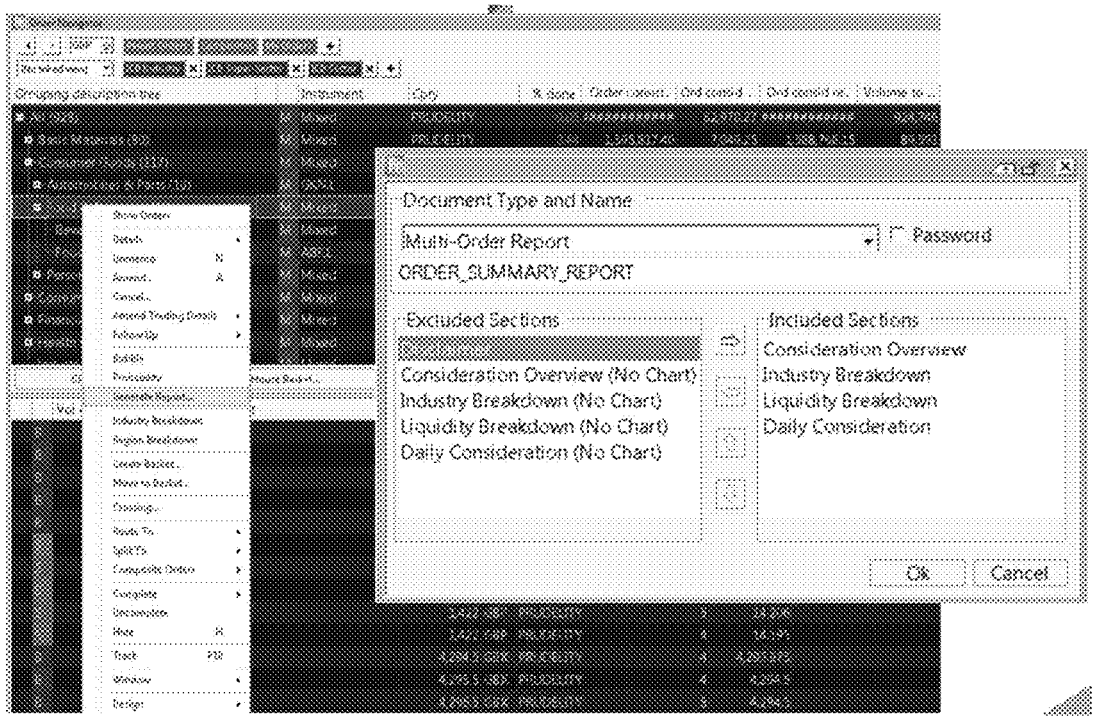

FIG. 6 schematically illustrates an example flow chart 600 configured to utilize the compliance application disclosed herein as it relates to market abuse monitoring. The example flow chart 600 relates to the detection of insider trading. By way of example only, a first order for an electronic trade can be received by the order management system. Information associated with historical trade data of the submitting user including previous trade information, trends, and the like, are analyzed to determine if the first order contains suspicious attributes. Suspicious attributes, in some embodiments, can be set by the user, such as a corporation, bank, business, financial institution, or the like. In one example, the customer can set an alert for a suspicious attribute for late trades, however the identification of the late trade as suspicious can occur after the sixth late trade (by way of continued example only and, in some embodiments, as set by a customer). One late trade in isolation may not contain sufficient information to be marked as suspicious. However, if six late trades occur, late trading may become a pattern, and thus, be marked as suspicious activity. As shown in FIG. 6, other elements of the order which can be considered suspicious include an unusual order size, unusual liquidity, a price move, an above index notification, and/or a news sentiment. The suspicious attributes can be processed through fuzzy map logic, which can include a statistical analysis utilized to gather a statistical percentage and determine if the statistical percentage is one, two, three, etc. standard deviations away from a statistical average. As such, the analyzing determines a client activity score, a price movement score, and/or a news sentiment score. If the combination of the client activity score, the price movement score, and the news sentiment score are above a predetermined threshold, the first order is flagged in response to the determining.

Fuzzy map logic is a form of many-valued logic in which the truth values of variables may be any real number between zero and one. Fuzzy map logic can handle the concept of partial truth, where the truth value can range between completely true and completely false. Fuzzy map logic can be used for market abuse detection as the inputs can be non-linear and the inputs can be easily described by fuzzy variables. Furthermore, fuzzy map logic uses expert knowledge to derive rules, avoids defining mathematical functions, and can be back tested against real data to check (i.e., how many are detected given a known number of orders). Also, three variable systems are relatively simple to construct. Fuzzy sets can be described as membership functions.

The first order is subsequently compared to a market snapshot captured at approximately the same time as the receipt of the first order and can further include data from previous time periods. A subgroup of information specifically containing the suspicious attributes (for example, an unusual size trade order, an unusually illiquid trade order, a price move, an above index trade, or the like) is then identified, and forwarded for a recommendation. A real-time or near real-time recommendation is then provided relating to and/or based on the subgroup of information containing the suspicious attributes. In some embodiments, the recommendation may be to block the trade, among other personalized and contextualized recommendations.

Figure 11:
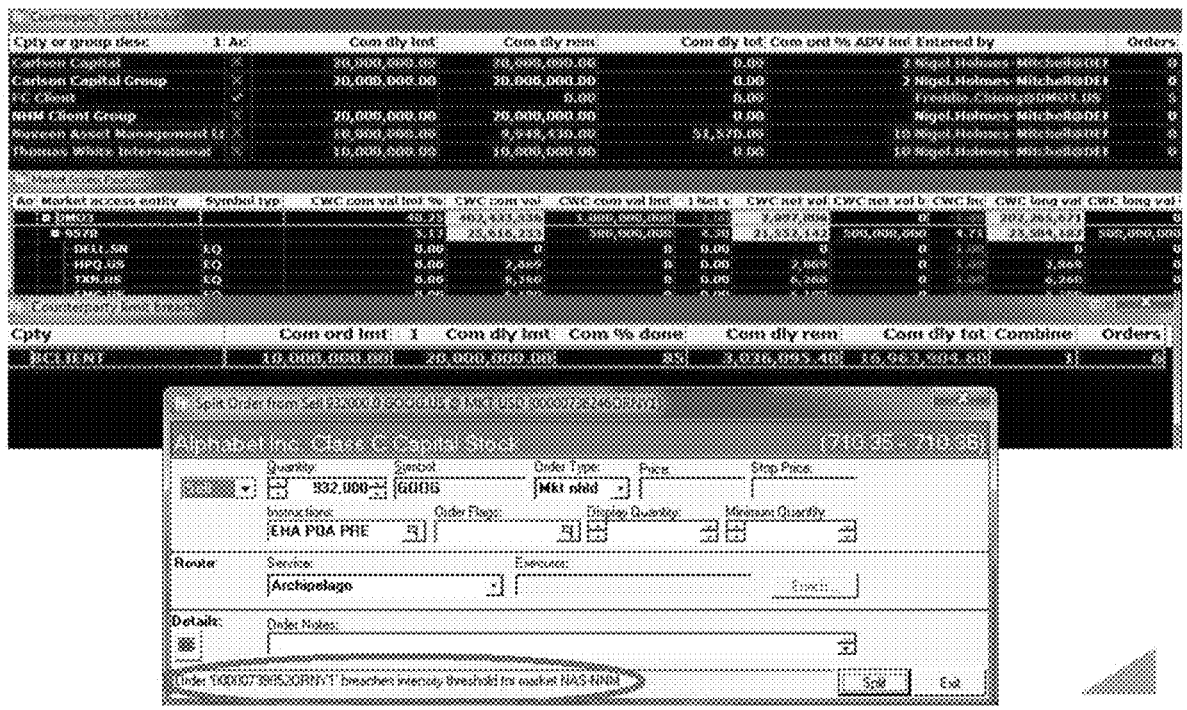
FIG. 11 schematically illustrates an example of a risk mitigation interface output, according to embodiments disclosed herein.

In addition, FIGS. 7, 8, 9, and 10 each schematically illustrate examples of a graphical user interface implementing the present disclosure. FIG. 11 schematically illustrates an example of a risk mitigation interface output implementing the present disclosure.

Benefits of the present disclosure include an automated compliance suite that includes integration directly into the order management system. Benefits of integrating directly with the order management system include the production and distribution of proactive contextualized alerts, the native integration into data streams, the checking and monitoring of known work flows, and not requiring a translation of data of fields. Furthermore, third party data is incorporated into the compliance suite and disparate data points are further leveraged across asset classes, including a cross market analysis. The compliance suite disclosed is improved in that it not only responds to events, but also incorporates preventative controls to detect potential issues before they occur, thus providing the ability to access and intelligently interrogate a firm's trading data. Furthermore, the present disclosure provides the tools to empower compliance, as well as the ability to become proactive, rather than reactive, and more efficient during exams and audits.

Although one or more embodiments have been described herein in some detail for clarity of understanding, it should be recognized that certain changes and modifications can be made without departing from the spirit of the disclosure. The embodiments described herein can employ various computer-implemented operations involving data stored in computer systems. Furthermore, the embodiments described herein employ various computer-implemented operations which can be adapted to be part of a computer system, the cloud, etc. For example, these operations can require physical manipulation of physical quantities—usually, though not necessarily, these quantities can take the form of electrical or magnetic signals, where they or representations of them are capable of being stored, transferred, combined, compared, or otherwise manipulated. Further, such manipulations are often referred to in terms, such as producing, yielding, identifying, determining, comparing, receiving, storing, calculating, or generating. Any operations described herein that form part of one or more embodiments of the disclosure can be useful machine operations. In addition, one or more embodiments of the disclosure also relate to a device or an apparatus for performing these operations. The apparatus can be specially constructed for specific required purposes, or it can be a general purpose computer selectively activated or configured by a computer program stored in the computer. In particular, various general purpose machines can be used with computer programs written in accordance with the teachings herein, or it can be more convenient to construct a more specialized apparatus to perform the required operations.

The embodiments described herein can be practiced with other computer system configurations including hand-held devices, microprocessor systems, microprocessor-based or programmable consumer electronics, minicomputers, mainframe computers, and the like.

One or more embodiments of the present disclosure can be implemented as one or more computer programs or as one or more computer program modules embodied in one or more computer readable media. The term computer readable medium refers to any data storage device that can store data which can thereafter be input to a computer system—computer readable media can be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Disc), a CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present disclosure have been described in some detail for clarity of understanding, it will be apparent that certain changes and modifications can be made within the scope of the claims. Accordingly, the described embodiments are to be considered as illustrative and not restrictive, and the scope of the claims is not to be limited to details given herein, but can be modified within the scope and equivalents of the claims. In the claims, elements do not imply any particular order of operation, unless explicitly stated in the claims.

Many variations, modifications, additions, and improvements can be made. Plural instances can be provided for components, operations or structures described herein as a single instance. Boundaries between various components, operations and data stores are somewhat arbitrary, and particular operations are illustrated in the context of specific illustrative configurations. Other allocations of functionality are envisioned and can fall within the scope of the disclosure (s). In general, structures and functionality presented as separate components in exemplary configurations can be implemented as a combined structure or component. Similarly, structures and functionality presented as a single component can be implemented as separate components. It will be apparent to those skilled in the art that various modifications and variations can be made in the method and system of the disclosed subject matter without departing from the spirit or scope of the disclosed subject matter. These and other variations, modifications, additions, and improvements can fall within the scope of the appended claim(s) and their equivalents.

As described above in connection with certain embodiments, certain components, e.g., the user computers 102 and the Compliance Application Server 112 can include a computer or computers, processor, network, mobile device, cluster, or other hardware to perform various functions. Moreover, certain elements of the disclosed subject matter can be embodied in computer readable code which can be stored on computer readable media and which when executed can cause a processor to perform certain functions described herein. In these embodiments, the computer and/or other hardware play a significant role in permitting the system and method for monitoring regulatory compliance within an order management system. For example, the presence of the computers, processors, memory, storage, and networking hardware provides the ability to monitoring regulatory compliance within an order management system in a more efficient manner. Moreover, monitoring regulatory compliance within an order management system and providing a recommendation relating to a subgroup of information containing suspicious attributes of a trade before the trade is executed, cannot be accomplished with pen or paper, as such information is received over a network in electronic form.

Additionally, as described above in connection with certain embodiments, certain components can communicate with certain other components, for example via a network, e.g., the internet. To the extent not expressly stated above, the disclosed subject matter is intended to encompass both sides of any transaction, including transmitting and receiving. One of ordinary skill in the art will readily understand that, with regard to the features described above, if one component transmits, sends, or otherwise makes available to another component, the other component will receive or acquire, whether expressly stated or not.

The presently disclosed subject matter is not to be limited in scope by the specific embodiments herein. Indeed, various modifications of the disclosed subject matter in addition to those described herein will become apparent to those skilled in the art from the foregoing description and the accompanying figures. Such modifications are intended to fall within the scope of the appended claims.

What is claimed is:

1. A method for proactively monitoring regulatory compliance within an order management system, comprising:
   retrieving historical trade data from a database connected to the order management system;
   receiving a first order from a user computer for a trade at the order management system;
   determining that the first order contains suspicious attributes by analyzing information associated with the historical trade data, and wherein the suspicious attributes indicate at least one of unusual trade size, unusual liquidity, or a price move;
   flagging the first order in response to the determining;
   comparing the first order to a market snapshot captured at a time in which the first order was received, wherein the market snapshot is retrieved from a historical quote database operatively connected to the order management system;
   identifying a subgroup of information including the suspicious attributes;
   providing a recommendation to a compliance application server, based on the comparing and the identifying, relating to the subgroup of information before the trade is executed, wherein the recommendation identifies the first order as including the suspicious attributes; and
   blocking, delaying, cancelling, or rejecting execution the first order, using the compliance application server, based on the recommendation.

2. The method of claim 1, wherein the historical trade data includes at least one of order data and trade data, wherein the order data and the trade data are each associated with at least two previous orders.

3. The method of claim 2, wherein the at least two previous orders relate to a same entity.

4. The method of claim 1, wherein the providing of the recommendation occurs in real-time.

5. A computer system for proactively monitoring regulatory compliance within an order management system, comprising:
   a processor; and
   a memory storing instructions that, when executed by the processor, cause the computer system to:
      retrieve historical trade data from a database connected to the order management system;
      receive a first order from a user computer for a trade at the order management system;
      determining that the first order contains suspicious attributes by analyzing information associated with historical trade data, and wherein the suspicious attributes indicate at least one of unusual trade size, unusual liquidity, or a price move;
      flag the first order in response to the determining;
      compare the first order to a market snapshot captured at a time in which the first order was received, wherein the market snapshot is retrieved from a historical quote database operatively connected to the order management system;
      identify a subgroup of information including the suspicious attributes; and provide a recommendation to a compliance application server, based on the comparing and the identifying, relating to the subgroup of information before the trade is executed, wherein the recommendation identifies the first order as including the suspicious attributes; and block, delay, cancel, or reject execution the first order, using the compliance application server, based on the recommendation.

6. The computer system of claim 5, wherein the historical trade data includes at least one of order data and trade data, wherein the order data and the trade data are each associated with at least two previous orders.

7. The computer system of claim 6, wherein the at least two previous orders relate to a same entity.

8. The computer system of claim 5, wherein the providing of the recommendation occurs in real-time.

9. A non-transitory computer-readable medium storing instructions that, when executed by a processor, cause a computer system to proactively monitor regulatory compliance in real-time or near real-time within an order management system, by performing the steps of:

retrieving historical trade data from a database connected to the order management system;

receiving a first order from a user computer for a trade at the order management system;

determining that the first order contains suspicious attributes by analyzing information associated with historical trade data, and wherein the suspicious attributes indicate at least one of unusual trade size, unusual liquidity, or a price move;

flagging the first order in response to the determining;

comparing the first order to a market snapshot captured at a time in which the first order was received, wherein the market snapshot is retrieved from a historical quote database operatively connected to the order management system;

identifying a subgroup of information including the suspicious attributes; and providing a recommendation to a compliance application server, based on the comparing and the identifying, relating to the subgroup of information before the trade is executed, wherein the recommendation identifies the first order as including the suspicious attributes; and blocking, delaying, cancelling, or rejecting execution the first order, using the compliance application server, based on the recommendation.

10. The non-transitory computer-readable medium of claim 9, wherein the historical trade data includes at least one of order data and trade data, wherein the order data and the trade data are each associated with at least two previous orders.

11. The non-transitory computer-readable medium of claim 10, wherein the at least two previous orders relate to a same entity.

* * * * *